(No Model.)
W. W. HORR.
ATTACHMENT FOR PUMPS.
No. 441,489. Patented Nov. 25, 1890.
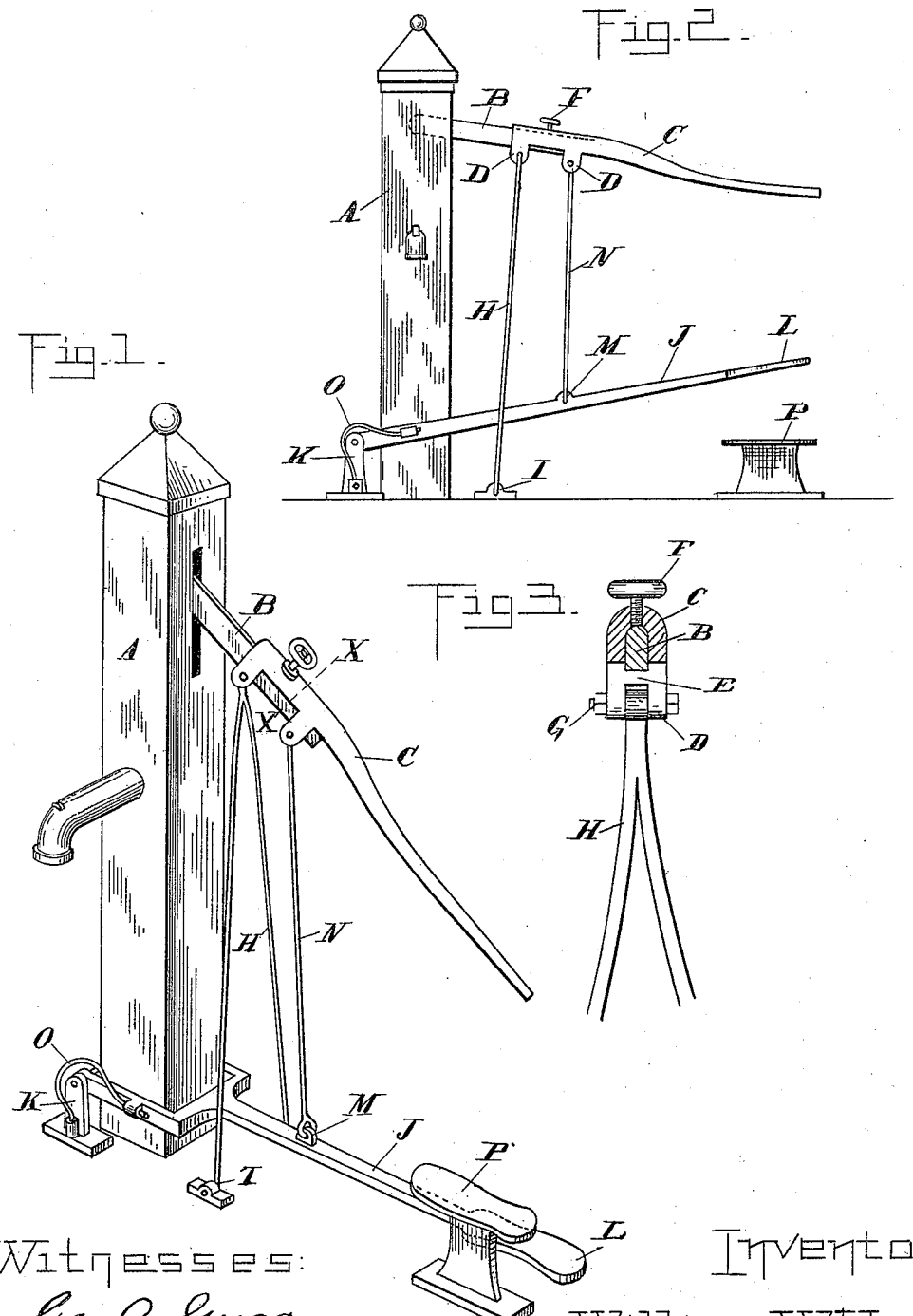
Witnesses:
Geo. A. Gregg.
P. M. Halbert
Inventor
William W. Horr
By James Whittemore
Att'y

UNITED STATES PATENT OFFICE.

WILLIAM W. HORR, OF LANSING, MICHIGAN.

ATTACHMENT FOR PUMPS.

SPECIFICATION forming part of Letters Patent No. 441,489, dated November 25, 1890.

Application filed December 14, 1889. Serial No. 333,807. (No model.)

*To all whom it may concern:*

Be it known that I, WILLIAM W. HORR, a citizen of the United States, residing at Lansing, in the county of Ingham and State of Michigan, have invented certain new and useful Improvements in Attachments to Pumps, of which the following is a specification, reference being had therein to the accompanying drawings.

This invention relates to new and useful improvements in attachments to pumps; and the invention consists in the peculiar construction of a movable fulcrum formed by making the handle in two parts—one slidingly engaged upon the other—and attaching the fulcrum-pin thereto, supporting it upon the pivotal support attached to the platform or other convenient point; further, in the peculiar combination, with such a handle and movable fulcrum, of a treadle attachment, whereby the weight of the operator may be used to assist in pumping, and whereby the stroke may be adjusted to the strength and weight of the operator, and, further, in the peculiar construction, arrangement, and combination of the various parts, all as more fully hereinafter described.

In the drawings which accompany this specification, Figure 1 is a perspective view of a pump to which my invention is attached. Fig. 2 is a side elevation. Fig. 3 is a vertical central section thereof on line X X in Fig. 1.

A is a pump-head of any desired construction, and B is the pump-handle, on the end of which is secured the sliding extension C, which is made of suitable shape to engage over the end of the pump-handle B and provided with the downwardly-projecting lugs D, which are connected on the under side by means of the cross-bar E, forming a suitable bearing to firmly hold the sliding extension upon the pump-handle, and suitable securing devices—such as the set-screw F—being used to clamp the two parts together.

G is the fulcrum-pin, which is secured in the lower extension of the lugs D, and is supported by the pivotal fulcrum-support H, consisting of vertical rods pivoted at I upon the platform.

It is evident that by loosening the set-screw F the handle of the short lever of the pump may be changed, thereby changing the length of the stroke and proportioning the work to the strength of the operator.

By securing the fulcrum-pin in the sliding extension C of the pump-handle it is evident that in changing the length of the short arm of the pump-lever the long arm remains constantly the same, which does away with the objection heretofore found with such devices having a movable fulcrum, wherein the length of the long lever was shortened in proportion as the length of the short lever was lengthened, which did not materially increase the efficiency of the working of the pump.

It is further evident that by pivoting the lower ends of the fulcrum-rods upon the platform they practically maintain the perpendicular in any adjusted position, thus avoiding the necessity of changing their base, which is the case with all adjustable fulcrum-supports; also, being independent of the pump, side draft is avoided.

To further assist in getting the best benefit from the weight and strength of the operator, I secure upon the platform a suitable treadle device, which is of the following construction: J is a treadle-lever, bifurcated at its rear end to embrace the standard of the pump, and pivoted to the standards K, secured to the platform, and provided at its other end with the bearing or foot piece L. This treadle-lever is provided with a suitable eye M, in which is engaged the connected rod N, which at its upper end is connected to the sliding extension C of the pump-handle, preferably in the lower extension of the second pair of lugs D. O are springs connected at one end to the standard and at the other end to the bifurcation of the treadle-lever J, acting with their tension upward upon the treadle-lever J to assist in raising the pump-handle. P is a raised foot-support secured upon the platform beside the foot-piece L of the treadle-lever J, affording a support for the other foot of the operator.

The parts being thus constructed and arranged, they are intended to operate as follows: The operator, placing his left foot upon the foot-support P and his right foot upon the foot-piece L, takes hold with his hands of the extension C of the pump-handle, throws his weight upon the left foot, when he will be supported upon the foot-support P, and with his hands he may easily raise the pump-handle and treadle, with the help of the springs O. Now in order to raise the plunger of the pump he depresses the handle, at the same time throwing his weight upon his right foot upon the treadle-lever J, thereby obtaining the benefit of his weight, together with the power of his hands, in raising the plunger of the pump. This makes it easy for a person of small strength to pump from a deep well, or enables the operator to make a long stroke with great ease, or to use a larger cylinder, whereby the pumping may be more quickly accomplished than by ordinary methods.

It is evident that in connection with the treadle-lever the operator may adjust the length of the stroke which he desires to have the pump take by means of the fulcrum, as described, and the pump thus adjusted to the weight and strength of the operator with the greatest nicety.

In using a single treadle-lever of this kind I find it desirable for convenience of the operation to have a raised foot-support, so that the foot of the operator may not be raised too high and into an awkward position in its upward position, nor too far below his other foot in its lowered position.

The springs shown I consider one of the most desirable forms of springs which may be applied to this device to assist in operating it; but it is obvious that other forms may be used to accomplish this result, so long as the springs act in an upward direction to assist in raising the treadle and lever of the pump. These springs are principally necessary in double-action pumps where a portion of the water is raised by the upward stroke of the handle, thus requiring a portion of the power upon said upward stroke.

What I claim as my invention is—

1. In a pump, the combination, with the handle, of a sliding extension on the handle carrying the fulcrum, whereby the length of the stroke may be adjusted, substantially as described.

2. In a pump, the combination, with the handle connected to the plunger-rod, of a sliding extension sleeved upon said handle, carrying the fulcrum-pin, and a pivotal support for said fulcrum-pin, substantially as described.

3. In a pump, the combination, with the handle B, of the sliding extension C, having the downwardly-projecting lugs D, connected by the cross-bar E of the fulcrum-pin G, pivotally secured in said extension, and the pivotal fulcrum-support H, pivoted at I upon the platform, substantially as described.

4. In a pump, the combination, with the handle secured at one end to a plunger-rod, of a sliding extension on said handle, a fulcrum for the handle, and a treadle connected with the extension, substantially as described.

5. In a pump, the combination, with the handle secured at one end to the plunger-rod, of a sliding extension on said handle carrying the fulcrum and a treadle connected to said sliding extension, substantially as described.

6. In a pump, the combination, with the handle, of the sliding extension on said handle carrying the fulcrum, the pivotal fulcrum-support, the treadle-lever J, connected to said extension by the rod N, the springs O, and the raised foot-support, the parts being arranged to operate substantially as and for the purpose described.

7. In a pump, the combination, with the handle having an adjustable fulcrum, of a treadle connected with the handle, substantially as described.

In testimony whereof I affix my signature, in presence of two witnesses, this 4th day of December, 1889.

WILLIAM W. HORR.

Witnesses:
 H. D. BARTHOLOMEW,
 W. H. HIGGS.